US006633937B2

(12) United States Patent
Thomson

(10) Patent No.: US 6,633,937 B2
(45) Date of Patent: Oct. 14, 2003

(54) GPIB SYSTEM AND METHOD WHICH PERFORMS AUTOPOLLING USING HEURISTICS

(75) Inventor: Andrew Thomson, Austin, TX (US)

(73) Assignee: National Instruments Corporation, Austin, TX (US)

( * ) Notice: Subject to any disclaimer, the term of this patent is extended or adjusted under 35 U.S.C. 154(b) by 509 days.

(21) Appl. No.: 09/746,734

(22) Filed: Dec. 21, 2000

(65) Prior Publication Data

US 2002/0083242 A1 Jun. 27, 2002

(51) Int. Cl.$^7$ .............................................. G06F 13/22
(52) U.S. Cl. ......................................... 710/109; 710/46
(58) Field of Search ............................. 710/44, 46, 52, 710/109, 220; 709/100

(56) References Cited

U.S. PATENT DOCUMENTS 3,633,169 A * 1/1972 Bickford
5,394,549 A * 2/1995 Stringfellow et al.
6,088,063 A * 7/2000 Shiba
6,219,669 B1 * 4/2001 Haff et al.

OTHER PUBLICATIONS

National Instruments Corporation, Instrumentation Catalogue 1998, GPIB Overview and Tutorial, pp. 606 through 623.

National Instruments Corporation, GPIB, NI–488.2 Software Reference Manual for MS–DOS, Nov. 1993 Edition, pp. 2–23 and 5–1 through 5–21.

National Instruments Corporation, Hands–On Course, IEEE 488.2 (GPIB), Jul. 1996 Edition, pp. 6–1 through 6–26.

* cited by examiner

Primary Examiner—Gopal C. Ray
(74) Attorney, Agent, or Firm—Meyertons Hood Kivlin Kowert & Goetzel, P.C.; Jeffrey C. Hood

(57) ABSTRACT

A system and method for GPIB autopolling of GPIB devices. A computer is coupled to one or more GPIB instruments through a GPIB to analyze, measure or control a process or unit under test. The computer includes a GPIB controller which monitors activity of the GPIB devices on the bus and produces heuristic information regarding the past behavior of the GPIB devices, such as a queue of one or more GPIB device IDs sorted by how recently each device was accessed. The heuristic information produced is stored on a memory and/or hard drive of the computer. A service request (SRQ) line assertion triggered by one or more GPIB devices may be received. The GPIB controller performs autopolling on the GPIB devices as ordered in the queue to determine which of the devices asserted the SRQ. If no queued devices asserted, the remainder of the devices are polled in arbitrary order.

13 Claims, 3 Drawing Sheets

GPIB SYSTEM AND METHOD WHICH PERFORMS AUTOPOLLING USING HEURISTICS

FIELD OF THE INVENTION

The present invention relates to GPIB instrumentation systems, and more particularly to a system and method for performing autopolling of GPIB instruments using heuristic information for improved efficiency.

DESCRIPTION OF THE RELATED ART

An instrument may be defined as a device which collects information from an environment and/or displays this information to a user. Examples of various types of instruments include oscilloscopes, digital multimeters, pressure sensors, etc. Types of information which might be collected by respective instruments include: voltage, resistance, distance, velocity, pressure, frequency of oscillation, humidity or temperature, among others.

The original GPIB was developed in the late 1960s by Hewlett-Packard (where it was called the HP-IB) to connect and control programmable instruments that Hewlett-Packard manufactured. With the introduction of digital controllers and programmable test equipment, the need arose for a standard, high-speed interface for communication between instruments and controllers from various vendors. In 1975, the Institute of Electrical and Electronic Engineers (IEEE) published ANSI/IEEE Standard 488-1975, IEEE Standard Digital Interface for Programmable Instrumentation, which contained the electrical, mechanical, and functional specifications of an interfacing system. The original IEEE 488-1975 was revised in 1978, primarily for editorial clarification and addendum. This bus is now used worldwide and is known by three names: General Purpose Interface Bus (GPIB), Hewlett-Packard Interface Bus (HP-IB), and IEEE 488 Bus.

The original ANSI IEEE 488 standard, now referred to as IEEE 488.1, was introduced in 1975 and greatly simplified the interconnection of programmable instruments by clearly defining mechanical, electrical and hardware protocol specifications. This enabled users to connect instruments from different manufacturers to a standard cable, thus allowing the instruments to communicate with each other. The original IEEE 488.1 standard dramatically improved the productivity of test engineers. However, this original standard included a number of limitations. More specifically, the IEEE 488.1 standard did not specify data formats, status reporting guidelines, a message exchange protocol, configuration commands, or a minimum set of device commands. As a result, different manufacturers implemented each item differently, resulting in integration problems for the test system developer.

In 1987, a new IEEE 488 standard for programmable instruments and devices was approved which strengthened the original IEEE 488.1 standard by precisely defining how controllers and instruments communicated with each other. The IEEE 488.2 standard kept the IEEE 488.1 standard completely intact while also defining standard data codes and formats, a status reporting model, a message exchange protocol, a set of common commands for all instruments, and controller requirements, therefore making systems more compatible and simplifying program development. In general, the IEEE 488.2 standard focuses on software protocol issues while the IEEE 488.1 standard is primarily hardware oriented.

Thus the IEEE 488 bus, also referred to as the General Purpose Instrumentation Bus (GPIB), is used for connecting instruments and controllers to a common bus to perform various test and measurement functions. The IEEE 488 Standard describes a standard interface for communication between instruments and controllers from various vendors. The IEEE 488.1 standard contains information about electrical, mechanical, and functional specifications. The GPIB is a digital, 8-bit parallel communications interface with data transfer rates of 1 Mbytes/s and above, using a 3-wire handshake. The bus supports one System Controller, usually a computer, and up to 14 additional instruments. The ANSI/IEEE Standard 488.2-1992 extends IEEE 488.1 by defining a bus communication protocol, a common set of data codes and formats, and a generic set of common device commands.

A typical GPIB system comprises one or more GPIB instruments, up to 14 instruments, and a controller, typically a GPIB interface board installed in a general purpose computer, connected by standard GPIB cables. A GPIB software application executes on the computer to control the instruments. The GPIB application interfaces through GPIB driver level software to the GPIB controller.

In response to the GPIB application, the controller provides program commands to the instruments, and the instruments return formatted data and response messages to the controller. GPIB instruments are message-based devices which are programmed with high-level ASCII character strings. A respective GPIB device includes a local processor that parses the command strings and sets the appropriate register bits to perform the indicated functions.

As noted above, a GPIB system includes GPIB driver level software which interfaces between a GPIB application and the GPIB hardware. The de facto standard for GPIB driver level software are the NI-488 and NI-488.2 software architectures, collectively referred to as the NI-488 software architecture, which is available in the NI-488 and NI-488.2 driver software products from National Instruments. The NI-488 software architecture includes an Application Programming Interface (API) which allows the GPIB application to call or invoke functions in the GPIB driver level software to communicate with the GPIB hardware. In other words, the GPIB driver level software handles the details of communication, i.e., the transfer of commands and data, over the GPIB connection between the computer and the GPIB instruments.

Autopolling

One function of a GPIB controller is to detect and respond to service requests from devices on the bus. The Service Request (SRQ) line on the GPIB is designed to signal the controller when a service request is pending. All devices share a single SRQ line. When a GPIB device asserts the SRQ line to request service, the controller must then determine which device is asserting the SRQ line and respond accordingly. The most common method for SRQ detection and servicing is the serial poll. Serial polling is a method of obtaining specific information from GPIB devices when they request service. When the controller serial polls the GPIB, the controller queries each device looking for the one that asserted SRQ. Each GPIB device responds to the poll by returning the value of its Status Byte. This Status Byte include one bit which indicates whether the device is asserting SRQ and 7 bits of other status information.

Some GPIB driver software programs, such as NI-488.2 driver software programs, have an internal feature called Automatic Serial Polling or Autopolling. If Autopolling is active and the SRQ line asserts, the driver will automatically 1) begin serial polling each device that has been opened by ibfind or ibdev, stopping when the SRQ line un-asserts; 2) store the serial poll response status byte(s) in a memory queue for later retrieval; and 3) set the RQS bit in the status word (ibsta) of each device that returned a status byte with Bit 6 set. The main advantage gained in using autopolling is that devices requesting service are polled as quickly as possible.

The controller may poll the eligible devices in any order it chooses. In prior art systems, the controller constructs a list of eligible devices in some arbitrary order. For example, the list of devices may be sorted in the order in which the controller was made aware of the devices. In another example, the list may be sorted by the GPIB address of the devices. During autopolling, the controller polls the devices in the listed order.

However, these approaches result in an arbitrary polling order, as mentioned above, and so the autopolling process may not poll the devices in an efficient manner. The polling stops when the controller locates the device asserting SRQ. Thus, the time required to complete a serial poll is related to the number of devices polled before SRQ unasserts. Therefore, improved systems and methods are desired for improving GPIB autopolling performance.

SUMMARY OF THE INVENTION

The present invention comprises various embodiments of a system and method for GPIB autopolling of GPIB devices. A GPIB instrumentation system may comprise a computer coupled to one or more GPIB instruments through a GPIB to analyze, measure or control a process or unit under test (UUT). The GPIB is coupled to the computer via a GPIB interface card which is typically plugged in to an I/O slot in the computer, such as a PCI bus slot, a PC Card slot, or an ISA, EISA or MicroChannel bus slot. Various other types of instruments may be comprised in the instrumentation system, such as a data acquisition board, a VXI instrument, or a serial instrument. The GPIB instruments are coupled to the process or unit under test (UUT), or are coupled to receive field signals, typically generated by transducers. The system may be used in data acquisition and control applications, in test and measurement applications, in process control applications, or in man-machine interface applications, among others.

The computer may comprise a CPU, memory, a display screen, and one or more input devices such as a mouse or keyboard. The computer preferably also includes a memory medium, such as a random access memory, which preferably stores a GPIB application and also stores GPIB driver level software according to one embodiment of the present invention. In the preferred embodiment, the GPIB driver level software is the NI-488.2 software available from National Instruments Corporation.

The software architecture for a GPIB instrumentation system may thus comprise a GPIB application program which interfaces through GPIB driver level software to one or more GPIB instruments. The top level of the software architecture typically comprises a GPIB application program used for high level control of the GPIB instruments. The GPIB application program may operate in conjunction with one or more instrument drivers to interface through the GPIB driver level software to the GPIB instruments.

The GPIB driver level software interfaces the commands or function calls in the GPIB application to the actual GPIB interface, or controller. In other words, in response to function calls made by the application, the GPIB driver level software communicates with the GPIB controller to control the GPIB instruments. In one embodiment, the GPIB driver software may also be operable to provide heuristic autopolling functions, described below.

In one embodiment of a GPIB heuristic autopolling process, the GPIB controller monitors activity of the GPIB devices on the bus. The GPIB controller may monitor any activity associated with each GPIB device, such as reads, writes, clear operations, device triggers, or any other activity associated with a GPIB device. In another embodiment, the GPIB controller may monitor a particular type of GPIB device activity, such as device service request (SRQ) line assertions.

The data generated by the monitoring process may be processed to produce heuristic information regarding the past behavior of the GPIB devices. The purpose of using heuristic information is to increase the probability (over uniform random chance) that the device responsible for the SRQ assertion will be polled first, or at least early on in the autopolling process. In a preferred embodiment, the heuristic information resulting from the above data processing may comprise a queue of the GPIB device IDs sorted according to a particular chosen heuristic.

The heuristic information (queue) may be generated and stored in the memory of the computer. In one embodiment old heuristic information may be periodically replaced with more recent information, thereby saving storage space as well as maintaining some level of relevance of the information. In other words, only heuristic information younger than some predetermined age may be maintained and used, thus the heuristic information may be periodically updated to reflect the recent history of the system. In another embodiment, the heuristic information stored may be limited to a particular amount of data. In this approach, after the stored information has reached a predetermined size or magnitude, old information may be deleted whenever new information is added, thereby maintaining a constant amount of heuristic information.

During operation of the GPIB system, a service request (SRQ) line assertion may be received or detected. The assertion may be triggered by one or more GPIB devices. The GPIB Controller may then perform autopolling on the GPIB devices to determine which of the devices asserted the SRQ. It is noted that autopolling refers to automatically polling the devices in response to receiving the SRQ assertion, i.e., the autopolling process is executed programmatically as opposed to being initiated by a user. The GPIB Controller may poll the devices in order according to the chosen heuristic, i.e., the order in which the devices are listed in the queue.

In one embodiment, the controller may maintain a queue of recently accessed devices, as mentioned above. A device may be considered accessed when any GPIB traffic is directed specifically to the device. For example, the controller may read or write data bytes to the device, or clear the device. The queue may have a constant depth N, where N is less than or equal to the number of eligible devices. Each entry in the queue may point to a unique (software description of a) device. For example, in the simplest case, each entry in the queue may comprise a device ID. The head of the queue points to the device most recently accessed. The next entry in the queue points to the second most recently accessed device, and so on. In other words, the queue entries may be sorted by how recently each device was accessed.

When the controller conducts an autopoll, the order of devices polled is the same as the order of devices in the queue. If none of the devices in the queue have asserted the SRQ, the controller polls all of the other devices in some arbitrary order. In the simplest case, N=1, i.e., the queue has a depth of one. After polling the most recently accessed device, the controller may poll the other devices in an arbitrary order.

In another embodiment, the controller may maintain a queue of devices that recently asserted SRQs (under the assumption that a device typically issues SRQs in clusters). As with the previous queue, the depth N of the queue is less than or equal to the number of eligible devices. In this embodiment, the head of the queue points to the device known to have most recently asserted SRQ. The next queue entry points to the next most recent device which has asserted SRQ, and so on. In other words, the queue entries may be sorted by how recently each device has asserted SRQ.

The controller may autopoll the devices in the order listed in the queue. As described above, if N is less than the number of eligible devices, the controller may poll the devices not in the queue in some arbitrary order. Again, in the simplest case N=1, so that if the device which most recently asserted SRQ is not responsible for the current SRQ assertion, the remainder of eligible devices may be polled in any order.

In other embodiments, other heuristics may be used as appropriate to improve the performance of the system. For example, other possible heuristics may involve combining the heuristics described above in various ways. The controller may maintain both queues (which may have different depths). The controller may alternate between the queues to choose devices to poll. The controller may also calculate the success of multiple heuristic techniques and dynamically choose different ones as their success in a particular system is recognized.

In the autopolling process, each device polled responds either positively or negatively. A positive response indicates that the device asserted the SRQ line. Once a device has given a positive response, it de-asserts the SRQ line. In one embodiment, multiple devices may assert the SRQ line concurrently. In this case the controller may autopoll the devices as described above, and upon receiving a positive response from a device indicating that the device asserted the SRQ, check the status of the SRQ line. If the SRQ line is still asserted, the controller may continue the autopolling process until all asserting devices have been identified. If all of the devices have been polled and the line remains asserted, an error condition may be indicated.

Thus, the system and method described above may improve GPIB autopolling performance by applying heuristics based on the activity history of GPIB devices to determine the order in which the GPIB devices are autopolled, thus shortening the expected (or average) time required to identify asserting GPIB devices.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENTS

Incorporation By Reference

The IEEE 488.1 specification and the IEEE 488.2 specification published by the IEEE are both hereby incorporated by reference in their entirety.

The NI-488 and NI-488.2 reference manuals, available from National Instruments Corporation, are hereby incorporated by reference in their entirety.

Figure 1:
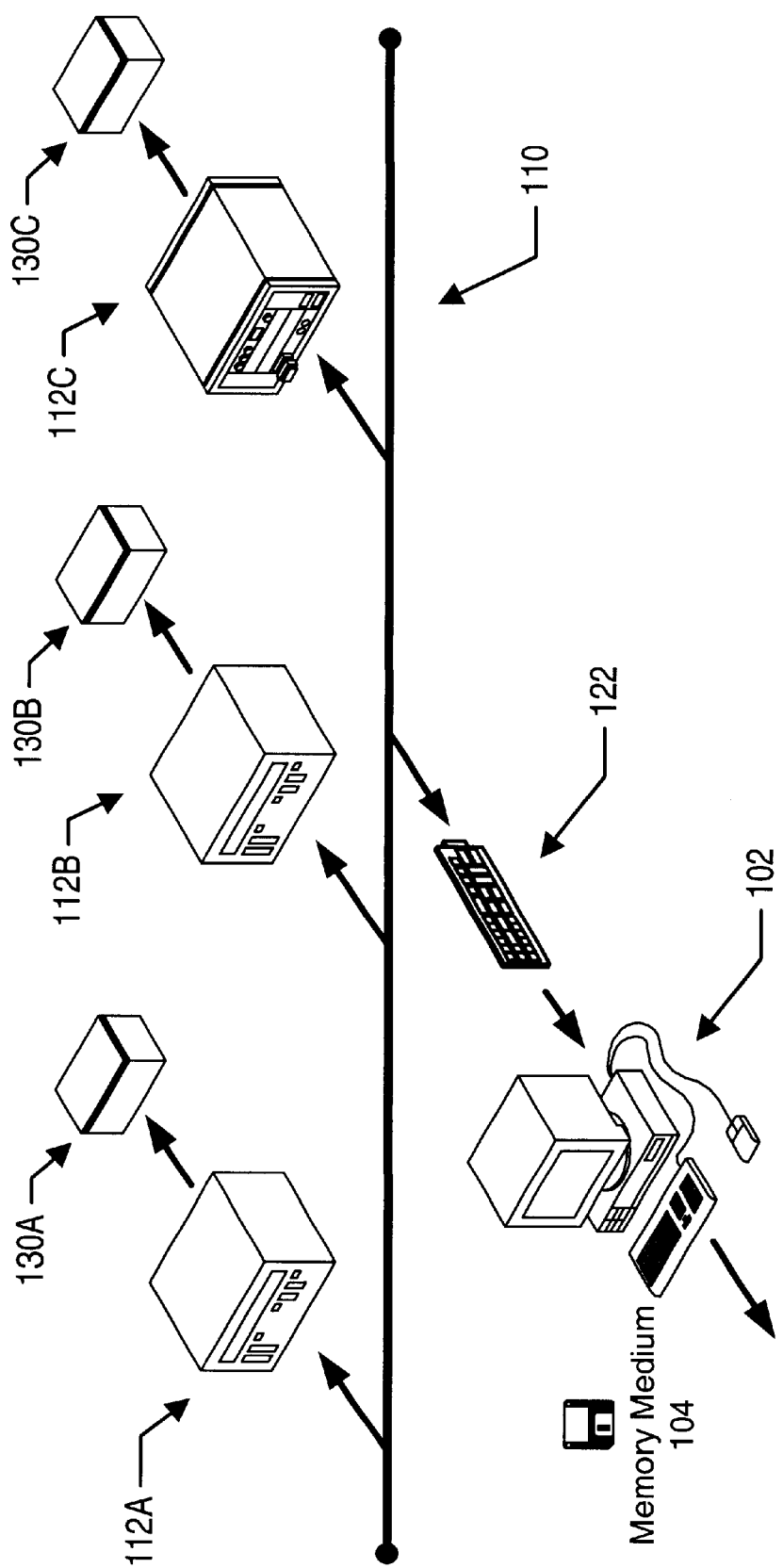
FIG. 1 illustrates a GPIB instrumentation system.

FIG. 1—GPIB Instrumentation System

Referring now to FIG. 1, an exemplary GPIB instrumentation control system 100 is shown. The GPIB instrumentation control system 100 is one example where the present invention may be used, and it is noted that embodiments of the invention may be used in the GPIB systems. The system 100 comprises a computer 102 which connects to one or more GPIB instruments 112 through a GPIB 110. The computer 102 may comprise a CPU, a display screen, memory, and one or more input devices such as a mouse or keyboard as shown. The computer 102 connects to the one or more GPIB instruments 112 to analyze, measure or control a process or unit under test (UUT) 130. The computer 102 may also take other forms, such as a controller in a VXI chassis or a PXI chassis.

The GPIB instruments 112 are each coupled through the GPIB 110 to the computer 102 via a GPIB interface card or controller 122 provided by the computer 102. The GPIB card 122 is typically plugged in to an I/O slot in the computer 102, such as a PCI bus slot, a PC Card slot, or an ISA, EISA or MicroChannel bus slot provided by the computer 102. However, the GPIB interface card 122 is shown external to computer 102 for illustrative purposes. The GPIB interface 122 may also comprise a card housed in a VXI or PXI chassis. It is noted that various other types of instruments may be comprised in the instrumentation system 100, such as a data acquisition board, a VXI instrument, or a serial instrument.

The GPIB instruments 112 are coupled to a process or unit under test (UUT) 130, or are coupled to receive field signals, typically generated by transducers. The system 100 may be used in data acquisition and control applications, test and measurement applications, process control applications, or man-machine interface applications, among others.

The computer system 102 preferably includes a memory medium on which computer programs according to the present invention are stored. The term "memory medium" is intended to include various types of memory or storage, including an installation medium, e.g., a CD-ROM, or floppy disks 104, a computer system memory or random access memory such as DRAM, SRAM, EDO RAM, Rambus RAM, etc., or a non-volatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

The memory medium preferably stores a GPIB application and also stores GPIB driver level software according to the present invention. The GPIB driver level software operates to perform autopolling in an order based on heuristics. In the preferred embodiment, the GPIB driver level software is the NI-488.2 software available from National Instruments Corporation. In other embodiments, the improved autopolling using heuristics may be performed by the software in the computer, i.e., not by the GPIB driver.

An embodiment of the present invention thus comprises software according to the present invention stored on a memory and/or hard drive of the computer 102 and executed by a CPU of the computer 102. The CPU executing code and data from the memory thus comprises a means for autopolling GPIB devices in a GPIB system in a heuristically determined order for improved performance, as described below.

Figure 2:
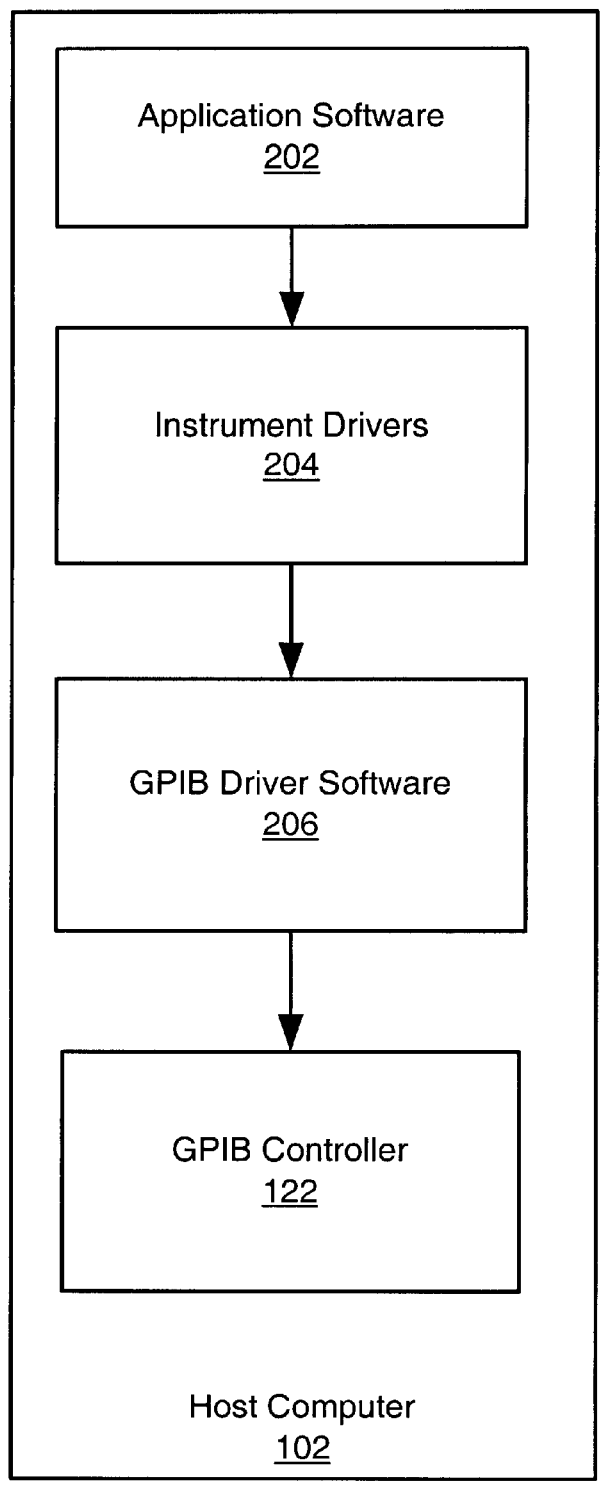
FIG. 2 illustrates the software architecture of the GPIB instrumentation system.

FIG. 2—GPIB Software Architecture

Referring now to FIG. 2, an exemplary software architecture for a GPIB instrumentation system is shown. As shown, the software architecture may comprise a GPIB application program which interfaces through GPIB driver level software to one or more GPIB instruments.

The top level of the software architecture typically comprises a GPIB application program 202 used for high level control of the GPIB instrument(s). The GPIB application program 202 may operate in conjunction with one or more instrument drivers 204 to interface through the GPIB driver level software 206 to the GPIB controller 122 and hence to the GPIB instruments. The GPIB application program 202 may be created with various development platforms, such as the LabVIEW graphical programming language or the LabWindows\CVI interactive C development environment. These software development environments include fully integrated GPIB libraries for instrument control. The GPIB application 202 makes calls to various functions in the GPIB driver level software 206 to communicate with the GPIB hardware 122.

The GPIB driver level software 206 interfaces the commands or function calls in the GPIB application 202 to the actual GPIB interface, or controller 122. In other words, in response to function calls made by the application 202, the GPIB driver level software 206 communicates with the GPIB controller 122 to control the GPIB instruments. The GPIB driver level software 206 thus handles the details of communication, i.e., the transfer of commands and data, over the GPIB connection between the computer 102 and the GPIB instruments. In one embodiment, the GPIB driver software 206 may also be operable to provide heuristic autopolling functions, described below with reference to FIGS. 3 and 4. As discussed in the background section, the de facto standard for GPIB driver level software is the NI-488 software architecture available from National Instruments. The NI-488 software architecture includes an Application Programming Interface (API) which allows the GPIB application 202 to call or invoke functions in the GPIB driver level software 206 to communicate with the GPIB hardware.

As discussed above, the GPIB hardware comprises a GPIB interface card 122, also referred to as a GPIB controller, typically a plug-in card to a personal computer, which couples through the GPIB 110 to the one or more GPIB instruments 112.

Figure 3:
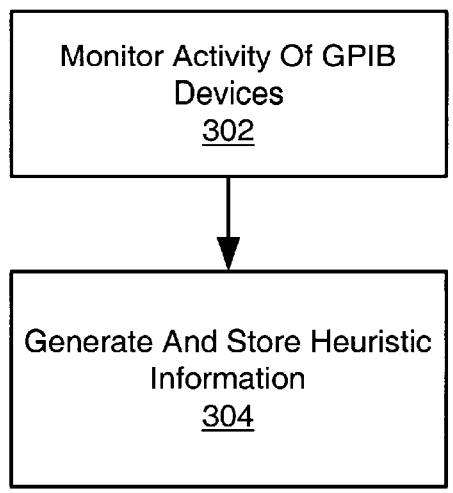
FIG. 3 is a flowchart diagram of one embodiment of a GPIB heuristic autopolling process.

FIG. 3—Flowchart of a GPIB Heuristic Autopolling Process

FIG. 3 is a flowchart of a GPIB heuristic autopolling process, according to one embodiment. As FIG. 3 shows, in 302 the GPIB Controller monitors activity of the GPIB devices on the bus. In one embodiment, the GPIB Controller may monitor any activity associated with each GPIB device, such as reads, writes, clear operations, device triggers, or any other activity associated with a GPIB device. In another embodiment, the GPIB Controller may monitor a particular type of GPIB device activity, such as device service request (SRQ) assertions.

The data generated by the monitoring process may be processed to produce heuristic information regarding the past behavior of the GPIB devices. This process may be as simple as tracking raw data traffic for each device, or may involve more complex data processing, such as calculating a moving average frequency and standard deviation for the traffic associated with each device. The purpose of using heuristic information is to increase the probability (over uniform random chance) that the device responsible for the SRQ assertion will be polled first, or at least early on in the autopolling process. In a preferred embodiment, the heuristic information resulting from the above data processing may comprise a queue of the GPIB device IDs (or other software representations) sorted according to a particular chosen heuristic. Two such heuristics are described below with reference to FIG. 4.

In 304, the heuristic information (queue) produced in 302 is stored. In the preferred embodiment, the heuristic information is stored on a memory and/or hard drive of the computer 102. In another embodiment, the heuristic information may be stored in memory comprised on the GPIB controller. In one embodiment, due to storage limitations and/or relevance issues, the stored heuristic information may comprise information associated with a moving temporal window. In other words, the heuristic information maintained may be produced based on data which is generated during a most recent time period. In this embodiment, old heuristic information may be periodically replaced with more recent heuristic information, thereby saving storage space as well as maintaining some level of relevance of the information. In other words, only heuristic information younger than some predetermined age may be maintained and used, thus the heuristic information may be periodically updated to reflect the recent history of the system. In another embodiment, the moving window may be quantitative rather than temporal, i.e., the heuristic information stored may be limited to a particular amount of data. In this approach, after the information stored has reached a predetermined size or magnitude, old information may be deleted whenever new information is added, thereby maintaining a constant amount of heuristic information. This approach may be used in systems with extremely limited storage/memory resources, such as on-chip systems, etc.

Figure 4:
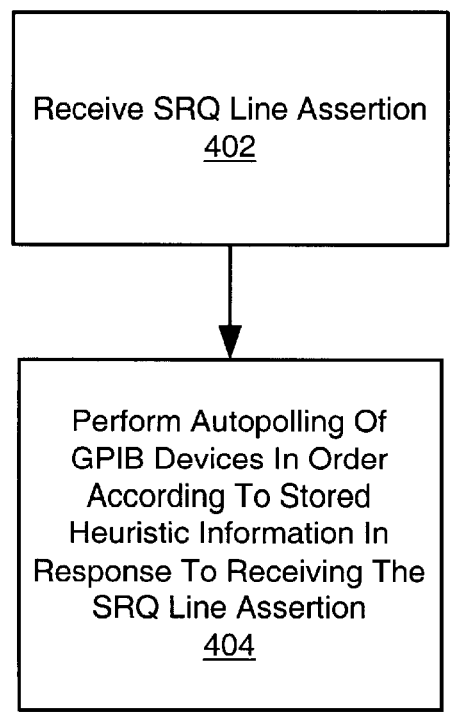
FIG. 4 is a flowchart diagram of another embodiment of a GPIB heuristic autopolling process.

FIG. 4—Flowchart of a GPIB Heuristic Autopolling Process

FIG. 4 is a flowchart diagram of a GPIB heuristic autopolling process, according to one embodiment. As FIG. 4 shows, in 402 a service request (SRQ) line assertion is received or detected. The assertion may be triggered by one or more GPIB devices.

Then, in 404, the GPIB Controller 122 performs autopolling on the GPIB devices 112 to determine which of the devices asserted the SRQ, as described above. It is noted that autopolling refers to automatically polling the devices in response to receiving the SRQ assertion, i.e., the autopolling process is executed programmatically, as opposed to being initiated by a user. The GPIB Controller polls the devices in order according to the chosen heuristic, i.e., the order in which the devices are listed in the queue, mentioned above with reference to FIG. 3. Two examples of applicable heuristics are described below.

Example Heuristic #1

In one embodiment, the controller may maintain a queue of recently accessed devices. A device may be considered accessed when any GPIB traffic is directed specifically to the device. For example, the controller may read or write data bytes to the device, or clear the device. The queue may have a constant depth N, where N is less than or equal to the number of eligible devices. Each entry in the queue may point to a unique (software description of a) device. For example, in the simplest case, each entry in the queue may comprise a device ID. The head of the queue points to the device most recently accessed. The next entry in the queue points to the second most recently accessed device, and so on. In other words, the queue entries may be sorted by how recently each device was accessed.

When the controller conducts an autopoll, the devices are polled in the order of devices in the queue. If none of the devices in the queue have asserted the SRQ, the controller polls all of the other devices in some arbitrary order. In the simplest case, N=1, i.e., the queue has a depth of one. After polling the most recently accessed device, the controller may poll the other devices in an arbitrary order.

Example Heuristic #2

In another embodiment, the controller may maintain a queue of devices that recently asserted SRQs (under the assumption that a device typically issues SRQs in clusters). As with the previous queue, the depth N of the queue is less than or equal to the number of eligible devices. In this embodiment, the head of the queue points to the device known to have most recently asserted SRQ. The next queue entry points to the next most recent device which has asserted SRQ, an so on. In other words, the queue entries may be sorted by how recently each device has asserted SRQ.

As described above, the controller may autopoll the devices in the order listed in the queue. As described above, if N is less than the number of eligible devices, the controller may poll the devices not in the queue in some arbitrary order. Again, in the simplest case N=1, so that if the device which most recently asserted SRQ is not solely responsible for the current SRQ, the remainder of eligible devices may be polled in any order.

It should be noted that the two heuristics described above relate to preferred embodiments of the system, and are not intended to limit the choice of heuristics used in the system, i.e., other heuristics may be used as appropriate to improve the performance of the system. For example, other possible heuristics may involve combining the heuristics described above. The controller may maintain both queues (which may have different depths). The controller may alternate between the queues to choose devices to poll. For example, the controller may poll the most recently accessed device first, then the device that most recently asserted SRQ. Other different combinations of these two heuristics may be used. In one embodiment, the controller may calculate the success of multiple heuristic techniques and dynamically choose different ones as their success in a particular system is recognized.

In the autopolling process, each device polled responds either positively or negatively. A positive response indicates that the device asserted the SRQ line. Once a device has given a positive response, it de-asserts the SRQ line. In one embodiment, multiple devices may assert the SRQ line concurrently. In this case the controller may autopoll the devices as described above, and upon receiving a positive response from a device indicating that the device asserted the SRQ, check the status of the SRQ line. If the SRQ line is still asserted, the controller may continue the autopolling process until all asserting devices have been identified. If all of the devices have been polled and the line remains asserted, an error condition may be indicated.

Thus, the system and method described above may improve GPIB autopolling performance by applying heuristics based on the activity history of GPIB devices. The application of such heuristics to determine the order in which the GPIB devices are autopolled may shorten the expected (or average) time required to identify asserting GPIB devices.

Conclusion

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system for communicating with a device, the system comprising:
    a host computer system, wherein the host computer system includes a host CPU and a host memory, wherein the host computer system includes a GPIB controller;
    a GPIB coupled to the host computer system;
    a plurality of GPIB devices coupled to the GPIB, wherein each of the plurality of GPIB devices is operable to assert a service request (SRQ) line on the GPIB;
    wherein the GPIB controller is operable to automatically poll the GPIB devices in response to the SRQ line assertion and generate autopoll results, wherein the GPIB controller is operable to automatically poll one or more of the GPIB devices in an order based on heuristic information of prior GPIB device operations.

2. The system of claim 1, wherein the GPIB controller is operable to automatically poll the one or more GPIB devices in an order based on prior activity of the GPIB devices.

3. The system of claim 2, wherein the prior activity of the GPIB devices comprises each device's SRQ line assertions, and wherein the GPIB controller is operable to automatically poll the one or more GPIB devices in order of most recent said prior activity, wherein the GPIB device with the most recent activity is polled first.

4. The system of claim 1, wherein the GPIB controller is operable to automatically poll the one or more GPIB devices in an order based on prior GPIB traffic involving each of the one or more GPIB devices.

5. The system of claim 4, wherein the prior GPIB traffic involving each of the one or more GPIB devices comprises one or more of reads, writes, clear operations, and device triggers to each of the one or more GPIB devices, and wherein the GPIB controller is operable to automatically poll the one or more GPIB devices in order of most recent said prior GPIB traffic, wherein the GPIB device involved with the most recent GPIB traffic is polled first.

6. The system of claim 1, wherein the host memory stores a user application, and a GPIB interface driver; and
    wherein the interface driver is executable to analyze the autopoll results and determine which of the GPIB devices asserted the SRQ line.

7. The system of claim 1, wherein the heuristic information comprises a queue, wherein the queue includes one or more ordered entries corresponding to the one or more GPIB devices.

8. The system of claim 1, wherein the GPIB controller is further operable to automatically poll the remainder of the plurality of GPIB devices if the SRQ line remains asserted after said automatically polling the one or more GPIB devices;

wherein said remainder of the GPIB devices are polled in an arbitrary order.

9. A method of communicating with a device, the method comprising:

monitoring activity of each of a plurality of GPIB devices coupled to a GPIB;

generating heuristic information in response to said monitoring, wherein the heuristic information characterizes said activity, and wherein the heuristic information indicates an ordering of one or more of the GPIB devices;

storing the heuristic information in a memory medium;

receiving a service request (SRQ) line assertion, wherein the SRQ line is asserted by at least one of the GPIB devices;

automatically polling the one or more GPIB devices according to the ordering indicated by the heuristic information; and determining which of the plurality of GPIB devices asserted the SRQ line.

10. The method of claim 9, wherein the activity comprises one or more of reads, writes, triggers, and clears involving each of the plurality of GPIB devices, and wherein the heuristic information indicates an ordering of the one or more GPIB devices based upon most recent said activity.

11. The method of claim 9, wherein the activity comprises SRQ line assertions by each of the plurality of GPIB devices, and wherein the heuristic information indicates an ordering of the one or more GPIB devices based upon most recent said activity.

12. The method of claim 9, wherein said heuristic information comprises a queue, wherein the queue includes one or more ordered entries corresponding to the one or more GPIB devices, and wherein said storing the heuristic information comprises storing the queue.

13. The method of claim 9, further comprising:

automatically polling the remainder of the plurality of GPIB devices if the SRQ line remains asserted after said automatically polling the one or more GPIB devices;

wherein said remainder of the GPIB devices are polled in an arbitrary order.

* * * * *